US010823500B2

(12) United States Patent
Asaka et al.

(10) Patent No.: US 10,823,500 B2
(45) Date of Patent: Nov. 3, 2020

(54) GAS PROCESSING FACILITY

(71) Applicants: JGC CORPORATION, Yokohama (JP); ELBRONS B.V., Nijkerk (NL)

(72) Inventors: Teru Asaka, Kanagawa (JP); Marc Ellmer, The Hague (NL)

(73) Assignees: JGC CORPORATION, Yokohama (JP); ELBRONS B.V., Nijkerk (NL)

( * ) Notice: Subject to any disclaimer, the term of this patent is extended or adjusted under 35 U.S.C. 154(b) by 132 days.

(21) Appl. No.: 16/091,530

(22) PCT Filed: Apr. 8, 2016

(86) PCT No.: PCT/JP2016/061555
§ 371 (c)(1),
(2) Date: Oct. 5, 2018

(87) PCT Pub. No.: WO2017/175384
PCT Pub. Date: Oct. 12, 2017

(65) Prior Publication Data
US 2019/0128599 A1 May 2, 2019

(51) Int. Cl.
*F28C 1/14* (2006.01)
*F25J 1/00* (2006.01)
(Continued)

(52) U.S. Cl.
CPC ........ *F25J 1/0297* (2013.01); *B01D 53/1456* (2013.01); *C10L 3/101* (2013.01);
(Continued)

(58) Field of Classification Search
CPC .......... B01D 2257/702; B01D 2257/80; B01D 2256/24; B01D 2256/245;
(Continued)

(56) References Cited

U.S. PATENT DOCUMENTS 3,830,196 A * 8/1974 Guttman ................. B44D 3/166
118/70
4,425,142 A * 1/1984 Mann ................. B01D 53/0423
62/636
(Continued)

FOREIGN PATENT DOCUMENTS

| JP | 37-10134 | 8/1962 |
| WO | 2015115030 | 8/2015 |
| WO | 2016001952 | 1/2016 |

OTHER PUBLICATIONS

"International Search Report (Form PCT/ISA/210) of PCT/JP2016/061555," dated Jun. 28, 2016, with English translation thereof, pp. 1-3.
(Continued)

*Primary Examiner* — Ljiljana V. Ciric
(74) *Attorney, Agent, or Firm* — JCIPRNET

(57) ABSTRACT

An air-cooled heat exchanger (6) arranged in a gas processing facility for performing a liquefaction process of natural gas is configured to supply cooling air to a tube (63) through which a fluid to be cooled is caused to flow, to thereby cool the fluid to be cooled, and a mist supply section (7) is configured to supply mist obtained by spraying demineralized water, to thereby cool the cooling air. Further, the mist supply section (7) is configured to spray the demineralized water from a lateral position on an upstream side of an intake.

8 Claims, 7 Drawing Sheets

(51) Int. Cl.
*F28F 25/06* (2006.01)
*F28B 9/04* (2006.01)
*F28B 5/00* (2006.01)
*C10L 3/12* (2006.01)
*C10L 3/10* (2006.01)
*F25J 1/02* (2006.01)
*B01D 53/14* (2006.01)

(52) U.S. Cl.
CPC .............. *C10L 3/12* (2013.01); *F25J 1/0022* (2013.01); *F25J 1/0052* (2013.01); *F25J 1/0055* (2013.01); *F25J 1/0087* (2013.01); *F25J 1/0216* (2013.01); *F25J 1/0241* (2013.01); *F25J 1/0292* (2013.01); *F25J 1/0296* (2013.01); *F28B 5/00* (2013.01); *F28B 9/04* (2013.01); *F28C 1/14* (2013.01); *F28F 25/06* (2013.01); *B01D 2256/24* (2013.01); *B01D 2256/245* (2013.01); *B01D 2257/602* (2013.01); *B01D 2257/702* (2013.01); *B01D 2257/80* (2013.01); *C10L 2290/06* (2013.01); *F25J 2220/64* (2013.01)

(58) Field of Classification Search
CPC . B01D 2257/602; B01D 53/1456; C10L 3/12; C10L 3/101; C10L 2290/06; F28B 9/04; F28B 5/00; F28C 1/14; F28F 25/06; F25J 1/0297; F25J 1/0292; F25J 1/0241; F25J 1/0296; F25J 1/0087; F25J 1/0055; F25J 1/0052; F25J 1/0022; F25J 1/0216; F25J 2220/64
See application file for complete search history.

(56) References Cited

U.S. PATENT DOCUMENTS

| | | | | |
|---|---|---|---|---|
| 5,925,291 | A * | 7/1999 | Bharathan | F28B 3/02 261/112.2 |
| 10,016,717 | B2 * | 7/2018 | Calafell | B01J 20/34 |
| 10,288,352 | B2 * | 5/2019 | Bugler | F28B 1/06 |
| 10,408,541 | B2 * | 9/2019 | Seawell | F28C 1/14 |
| 2007/0101746 | A1 * | 5/2007 | Schlom | F24F 5/0007 62/310 |
| 2009/0165435 | A1 * | 7/2009 | Koranek | F23R 3/343 60/39.463 |
| 2010/0307834 | A1 * | 12/2010 | Largent | B09C 1/02 175/206 |
| 2011/0100593 | A1 * | 5/2011 | Benz | F28F 1/36 165/59 |
| 2016/0214027 | A1 * | 7/2016 | Fukuda | C02F 1/048 |

OTHER PUBLICATIONS

"Written Opinion of the International Searching Authority (Form PCT/ISA/237)" of PCT/JP2016/061555, dated Jun. 28, 2016, with English translation thereof, pp. 1-11.

"Office Action of India Counterpart Application", dated Mar. 2, 2020, with (partial) English translation thereof, p. 1-p. 3.

* cited by examiner

GAS PROCESSING FACILITY

CROSS-REFERENCE TO RELATED APPLICATION

This application is a 371 application of International PCT application serial no. PCT/JP2016/061555, filed on Apr. 8, 2016. The entirety of each of the abovementioned patent applications is hereby incorporated by reference herein and made a part of this specification.

TECHNICAL FIELD

The present invention relates to a technology of supplying cooling air to an air-cooled heat exchanger arranged in a gas processing facility for processing natural gas and the like.

BACKGROUND ART

Natural gas produced from a wellhead is subjected to a processing for separating impurity components, such as acid gas and water, and to a liquefaction process for liquefying the natural gas. Further, the natural gas may be subjected to a processing for recovering a part of high-value added components contained in the natural gas, a processing for producing synthesis gas containing carbon monoxide and hydrogen as main components from the natural gas, and to a processing for synthesizing a compound, such as methanol, and liquid fuel from the natural gas or the synthesis gas.

In a gas processing facility for performing various processings described above, a large number of air-cooled heat exchangers (hereinafter referred to also as "ACHEs") configured to cool various fluids (fluids to be cooled), which are handled in the gas processing facility, are arranged. The ACHE is configured to supply cooling air through use of a rotary fan toward a tube bundle obtained by binding tubes through which the fluid to be cooled is caused to flow, to thereby cool the fluid to be cooled.

For example, in Patent Literature 1, there is described a technology involving, in a liquefied gas producing facility for performing a processing for liquefying natural gas, spraying mist of demineralized water to cooling air to be supplied to ACHEs, which are large in occupied area (large in number of installed ACHEs), and are configured to cool a first refrigerant being a refrigerant for cooling a second refrigerant to be used for precooling of feed gas to be processed or liquefaction of the natural gas, to thereby enhance the performance of the gas processing facility.

CITATION LIST

Patent Literature

[Patent Literature 1] WO 2015/115030 A1

SUMMARY OF INVENTION

Technical Problem

In the technology described in Patent Literature 1, a plurality of spray nozzles configured to spray demineralized water are arranged on a lower surface side of the ACHE into which cooling air is sucked, and mist of the sprayed demineralized water is sucked upward (paragraph 0087, FIG. 13).

From the viewpoint of downsizing a scale of the facility, there has been a demand to minimize the height of a space through which the cooling air to be sucked into the ACHE is caused to flow. As a result, when the distance between the spray nozzles of the demineralized water and an intake of the ACHE becomes shorter, apart of the mist that has not been completely evaporated reaches a tube so that the surface of the tube may be wetted. When the tube is wetted with the demineralized water, there is a risk in that corrosion is caused or salts, such as calcium, remaining in a trace amount in the demineralized water are precipitated, to thereby decrease a cooling efficiency.

The present invention has been made under the circumstances described above, and an object of the present invention is to provide a gas processing facility capable of enhancing the performance of an air-cooled heat exchanger while suppressing the influence on apparatus from spraying of demineralized water to the air-cooled heat exchanger to be used in a processing of natural gas.

Solution to Problem

According to one embodiment of the present invention, there is provided a gas processing facility for performing at least one of liquefaction of natural gas, separation and recovery of a component in the natural gas, production of synthesis gas from the natural gas, or synthesis of a compound containing the natural gas or the synthesis gas as a raw material, the gas processing facility including:

an air-cooled heat exchanger configured to supply cooling air taken through an intake into a tube through which a fluid to be cooled is caused to flow, to thereby cool the fluid to be cooled; and a mist supply section configured to supply mist, which is obtained by spraying demineralized water to the cooling air to be taken into the air-cooled heat exchanger, to thereby cool the cooling air, the mist supply section being configured to spray the demineralized water from a lateral position on an upstream side of the intake.

The gas processing facility may have the following features.

(a) The gas processing facility further includes a pipe rack having framework structure, which is configured to hold a bundle of pipes through which the fluid to be cooled is caused to flow. The air-cooled heat exchanger is arranged in a top portion of the pipe rack at a position above the bundle of the pipes under a state in which the intake is oriented downward. The mist supply section is configured to spray the demineralized water from a lateral side toward a space below the air-cooled heat exchanger having the intake opened therein.

(b) In the feature (a), the pipe rack includes a floor configured to partition the bundle of the pipes and the air-cooled heat exchanger, and the demineralized water is sprayed from the mist supply section toward a space between the air-cooled heat exchanger and the floor. In this case, the mist supply section is configured to spray the demineralized water at a height position within a range of up to ⅔ of a lower side of a height from the floor to the intake of the air-cooled heat exchanger.

(c) In the feature (a), the pipe rack is formed into a rectangle when viewed from an upper surface side of the pipe rack, the air-cooled heat exchanger includes a plurality of air-cooled heat exchangers arranged side by side in series along a short side of the rectangle, and a plurality of groups, each including the plurality of air-cooled heat exchangers, are arranged side by side along a long side of the rectangle. In this case, the mist supply section is arranged along the long side of the pipe rack. Further, out of the plurality of air-cooled heat exchangers arranged side by side in series, the air-cooled heat exchanger arranged at a position facing the long side has the intake with a windshield configured to block wind flowing into the space below the air-cooled heat exchanger.

(d) In the feature (a), the mist supply section includes a plurality of spray nozzles configured to spray the demineralized water at different height positions. Out of the plurality of spray nozzles configured to spray the demineralized water at the different height positions, a part of the plurality of spray nozzles is configured to spray the demineralized water in a direction opposite to a direction opposed to the space below the air-cooled heat exchanger.

Advantageous Effects of Invention

In the present invention, the mist supply section configured to spray the demineralized water from the lateral position on the upstream side of the intake for taking the cooling air into the air-cooled heat exchanger is arranged, and hence the movement distance required for the mist of the demineralized water sprayed from the mist supply section to reach the intake can be increased. As a result, the cooling performance of the air-cooled heat exchanger can be enhanced, while the ratio of the mist reaching the intake without being evaporated is reduced, to thereby suppress the influence on the apparatus from wetting of the tube of the air-cooled heat exchanger with the demineralized water.

DESCRIPTION OF EMBODIMENTS

As an example of a gas processing facility according to an embodiment of the present invention, a configuration example of a NG liquefier, which includes ACHEs 6 in which demineralized water is sprayed to cooling air and is configured to liquefy natural gas (hereinafter referred to also as "NG"), is described with reference to FIG. 1.

Figure 1:
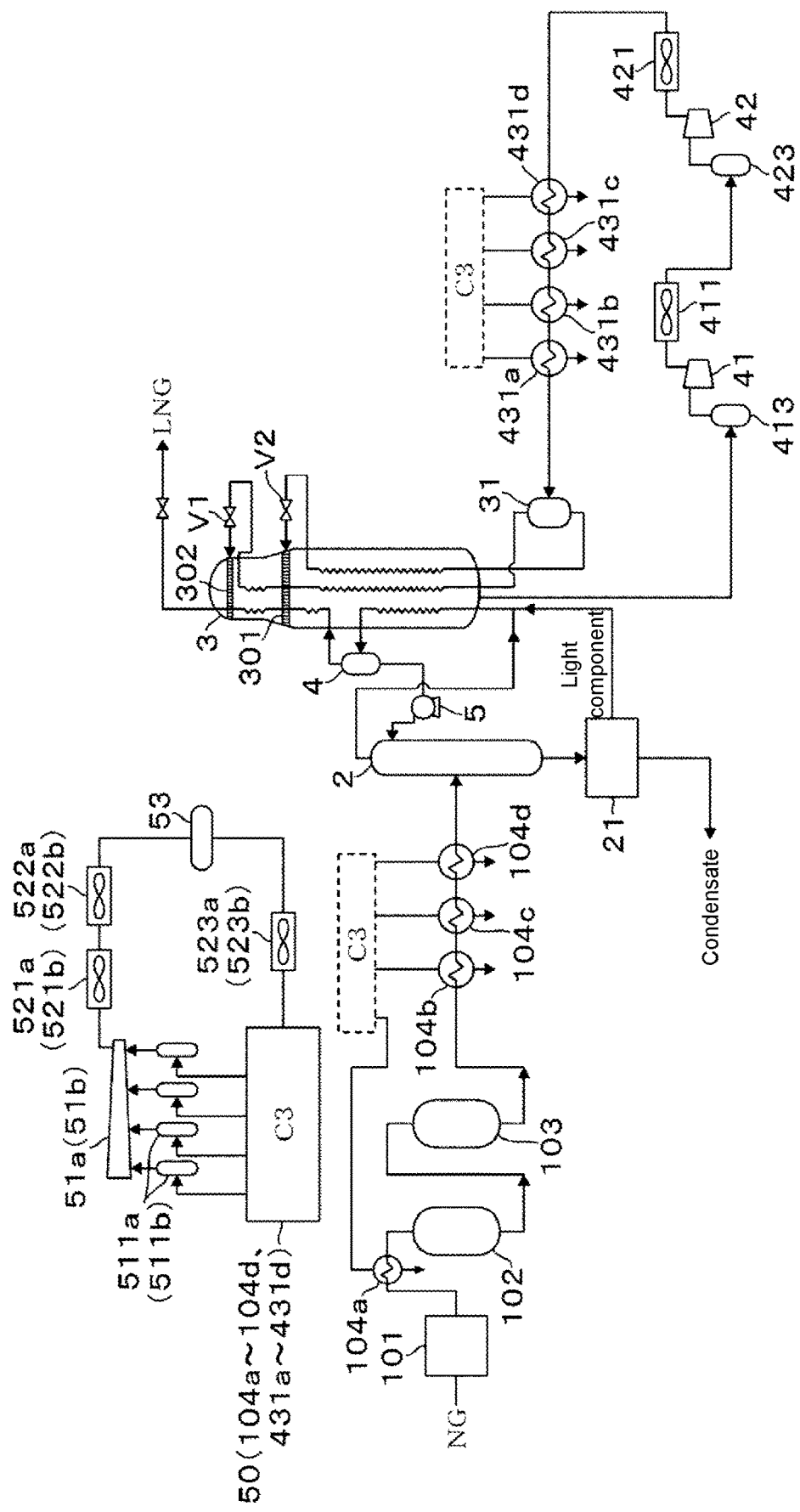
FIG. 1 is a schematic view for illustrating an example of a NG liquefier.

As illustrated in FIG. 1, the NG liquefier of this embodiment includes, for example, four-stage precooling heat exchangers 104a to 104d configured to precool NG with a precooling refrigerant, a scrub column 2 configured to separate a heavy component from the NG, a main cryogenic heat exchanger (MCHE) 3 configured to liquefy the precooled NG, and compressors 41, 42, and 51a (51b) configured to compress gas of the precooling refrigerant and mixed refrigerant (hereinafter referred to also as "MR") after heat exchange.

The NG supplied from a wellhead is subjected to various preprocesses involving the removal (separation) of an acid gas component by an acid gas removal unit 101 using an amine solution, the precooling by the precooling heat exchanger 104a in the first stage, the removal of water by a water removal unit 102, and the removal of mercury by a mercury removal unit 103, and is supplied to the precooling heat exchangers 104b to 104d in the second and subsequent stages. In the NG liquefier of this embodiment, while the above-mentioned preprocesses are performed, through use of a precooling refrigerant containing propane as a main component (hereinafter referred to also as "C3 refrigerant"), the NG supplied at a temperature of, for example, from 40° C. to 50° C. is cooled to the vicinity of from −30° C. to −40° C. by the four-stage precooling heat exchangers 104a to 104d having different pressure levels.

The scrub column 2 is configured to separate the NG that has been precooled by the precooling heat exchangers 104a to 104d into a gas on a column overhead side containing a large amount of methane and a liquid on a column bottom side containing a large amount of a hydrocarbon component that is heavier than methane. The scrub column 2 may include a scrub column reflux apparatus (reflux drum 4 and reflux pump 5) in order to remove a heavy component effectively in a column overhead portion. In the scrub column reflux apparatus, the NG fluid flowing on a lower side of the MCHE 3 is temporarily extracted from the MCHE 3 and separated into a gas and a liquid in the reflux drum 4, and the gas extracted from an upper portion of the reflux drum 4 is returned to the MCHE 3 again. The liquid extracted from a bottom portion of the reflux drum 4 is returned to the column overhead of the scrub column 2 with the reflux pump 5.

The gas flowing out from the column overhead side of the scrub column 2 is supplied to a tube for NG in a bottommost portion of the MCHE 3 and cooled with the MR flowing on a shell side of the MCHE 3.

Further, the liquid flowing out from the column bottom side of the scrub column 2 is separated into a condensate which is a liquid at normal temperature, and into ethane, propane, and butane which are components lighter than the condensate in a rectification section 21 including a rectification column (not shown). The light components having the condensate removed therefrom are joined with the gas flowing out from the column overhead of the scrub column 2, thereby being supplied to the tube for NG of the MCHE 3 or being independently sent to the tube of the MCHE 3. In FIG. 1, there is illustrated a case in which the light components separated and recovered in the rectification section are joined with the tube for NG.

The gas supplied to the tube for NG of the MCHE 3 is cooled, liquefied, and further subcooled with the MR flowing down on the shell side of the MCHE 3, and is extracted from the overhead portion of the MCHE 3 as LNG cooled to from about −150° C. to about −155° C.

Next, a flow of the MR (MR cycle) for liquefaction and subcooling of the NG in the MCHE 3 is described. The MR used for cooling of the NG is extracted from the bottom portion of the shell of the MCHE 3 in a state of a gas as a low-pressure MR (temperature: about −40° C.). After liquid droplets are separated from the low-pressure MR in a suction drum 413, the low-pressure MR is increased from a low pressure to a medium pressure by the low-pressure MR compressor 41 and further cooled by an aftercooler 411.

After liquid droplets are separated from the medium-pressure MR, which has been cooled by the aftercooler 411, in a suction drum 423, the medium-pressure MR is increased from a medium pressure to a high pressure by the medium-pressure MR compressor 42 and further cooled by an aftercooler 421 (temperature: about 40° C.).

The high-pressure MR is further cooled with the C3 refrigerant in chillers 431a to 431d and supplied to a high-pressure MR separator 31 as a gas-liquid mixed fluid to be subjected to gas-liquid separation.

The gas MR (having a temperature of from about −30° C. to about −40° C.) subjected to gas-liquid separation in the high-pressure MR separator 31 is introduced into a tube for MR from a column bottom side of the MCHE 3, and is then extracted from the upper position of the MCHE 3. The temperature of the MR extracted from the MCHE 3 is from about −150° C. to about −155° C. The MR extracted from the MCHE 3 is expanded by an expansion valve V1, and is then supplied to the shell side of the MCHE 3 uniformly through a liquid dispersion device (distributor) 302 arranged on the overhead side of the MCHE 3.

Meanwhile, the liquid MR (having a temperature of from about −30° C. to about −40° C.) subjected to gas-liquid separation in the high-pressure MR separator 31 is introduced toward the tube for MR from the bottom side of the MCHE 3 to be cooled, and is then extracted from the middle of the MCHE 3 before reaching the upper position. The temperature of the extracted liquid MR is from about −120° C. to about −125° C., and thus the extracted liquid MR is sufficiently subcooled. After the liquid MR is expanded by an expansion valve V2, the liquid MR is introduced into the shell side of the MCHE 3 uniformly through a liquid dispersion device (distributor) 301 of the liquid MR.

The MR introduced into the shell side of the MCHE 3 through the liquid dispersion devices 302 and 301 arranged in two upper and lower stages is used for the liquefaction and subcooling of the NG flowing through the tube for NG and the cooling of the gas MR and the liquid MR flowing through the tube for MR, and is then extracted from the bottom portion of the MCHE 3 as a low-pressure MR to be supplied to the low-pressure MR compressor 41 again.

Next, a flow of the C3 refrigerant (C3 cycle) to be used for the precooling of the NG and the cooling of the high-pressure MR is described. The gas of the C3 refrigerant subjected to heat exchange with the NG in the precooling heat exchangers 104a to 104d and heat exchange with the high-pressure MR in the chillers 431a to 431d has liquid droplets separated therefrom in suction drums 511a and 511b, and is branched to be supplied to a suction side in each stage of one or two C3 compressors 51a and 51b configured to perform, for example, four-stage compression in accordance with the pressure level of each C3 refrigerant. For convenience of illustration, in FIG. 1, the two C3 compressors 51a and 51b are illustrated collectively in one figure.

Further, for convenience of illustration, in the C3 cycle, individual descriptions of the precooling heat exchangers 104a to 104d and the chillers 431a to 431d, and the expansion valves each arranged on an upstream side of the precooling heat exchangers 104a to 104d and chillers 431a to 431d are omitted, and those apparatus are collectively referred to as "C3 refrigerant heat exchanging unit 50".

The C3 refrigerant compressed to a predetermined pressure by the C3 compressors 51a and 51b is decreased in temperature in desuperheaters 521a and 521b and condensers 522a and 522b, and the C3 refrigerant that has been completely condensed is recovered in a separator 53. Then, the C3 refrigerant is subcooled by subcoolers 523a and 523b to be supplied to the C3 refrigerant heat exchanging unit 50 again.

In the NG liquefier having the schematic configuration described above, the aftercoolers 411 and 421 arranged in the MR cycle, and the desuperheaters 521a and 521b, the condensers 522a and 522b, and the subcoolers 523a and 523b arranged in the C3 cycle are each formed of the ACHE 6. In the aftercoolers 411 and 421, the MR corresponds to a fluid to be cooled, and in the condensers 522a and 522b and the subcoolers 523a and 523b, the C3 refrigerant corresponds to a fluid to be cooled.

Figure 2:
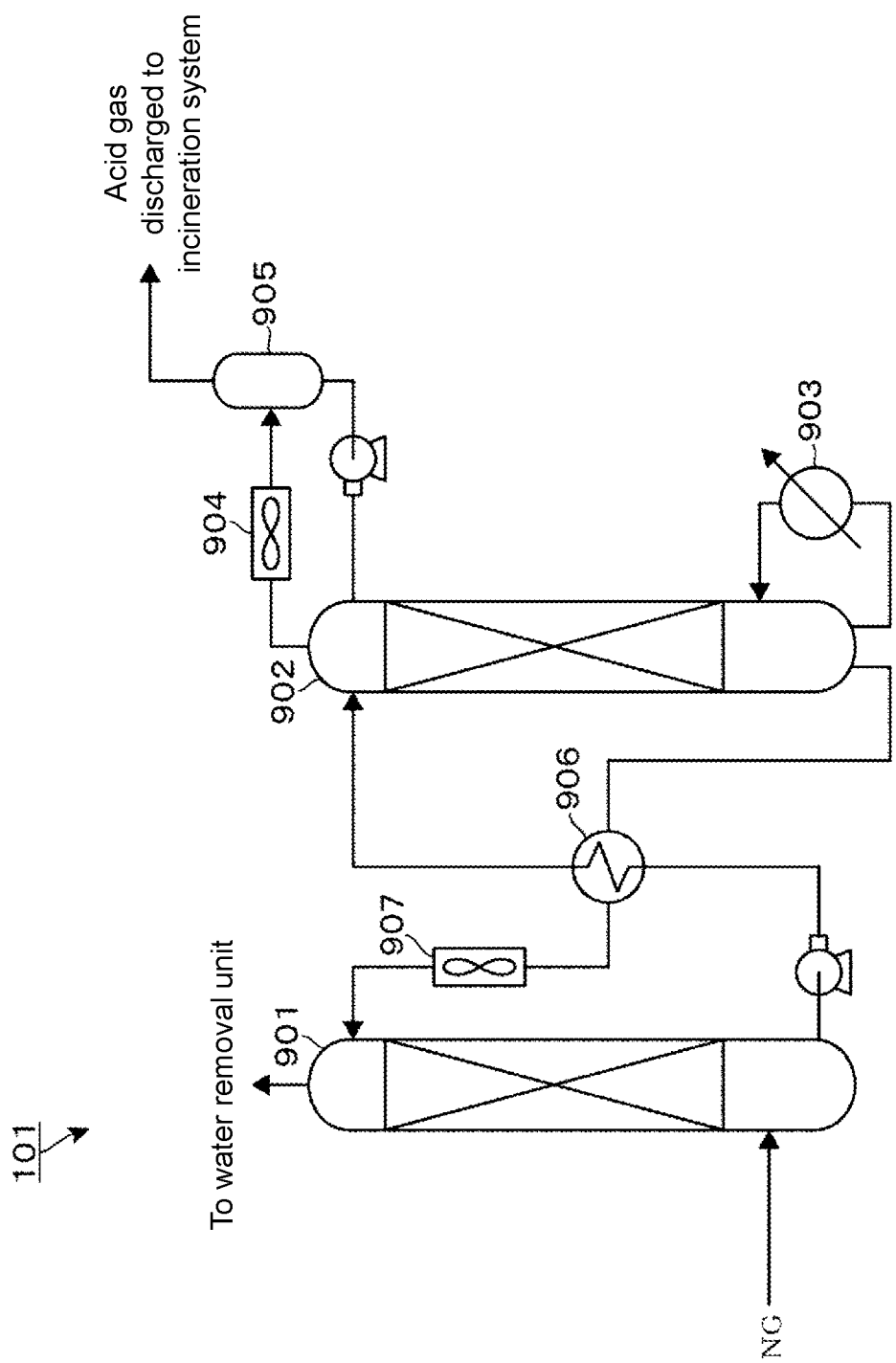
FIG. 2 is an explanatory view for illustrating a configuration example of an acid gas removal unit arranged in the NG liquefier.

In addition to the foregoing, as a facility arranged in the NG liquefier and including the ACHEs 6, the acid gas removal unit 101 described above may be given. FIG. 2 is an illustration of a configuration example of the acid gas removal unit 101. The acid gas removal unit 101 illustrated in FIG. 2 adopts an amine absorption method.

In the acid gas removal unit 101 illustrated in FIG. 2, the NG containing an acid gas component being impurities is brought into contact with an absorption solution containing an amine compound in an amine absorption column 901 and has the acid gas component separated and removed therefrom to be sent to the water removal unit 102 arranged downstream. Meanwhile, the absorption solution having absorbed acid gas is heated by a reboiler 903 in an amine regeneration column 902 and diffuses the acid gas to be sent to the amine absorption column 901 again. A regenerated amine solution discharged from a bottom portion of the amine regeneration column 902 has high temperature, and hence heat exchange is performed in a heat exchanger 906 between the regenerated amine solution and the low-temperature acid gas absorption amine solution discharged from a bottom portion of the amine absorption column 901. Further, the regenerated amine solution needs to be cooled to a required temperature, and hence is cooled by a regenerated amine solution cooler 907.

Meanwhile, the acid gas diffused from the absorption solution is cooled in a regeneration column overhead condenser 904 and is subjected to gas-liquid separation in an acid gas gas-liquid separation drum 905 to be discharged to an outside such as an incineration system.

In the acid gas removal unit 101 described above, the regenerated amine solution cooler 907 and the regeneration column overhead condenser 904 are each formed of the ACHE 6. In this case, the absorption solution and the acid gas that is a component separated from the NG correspond to the fluids to be cooled.

Figure 3:
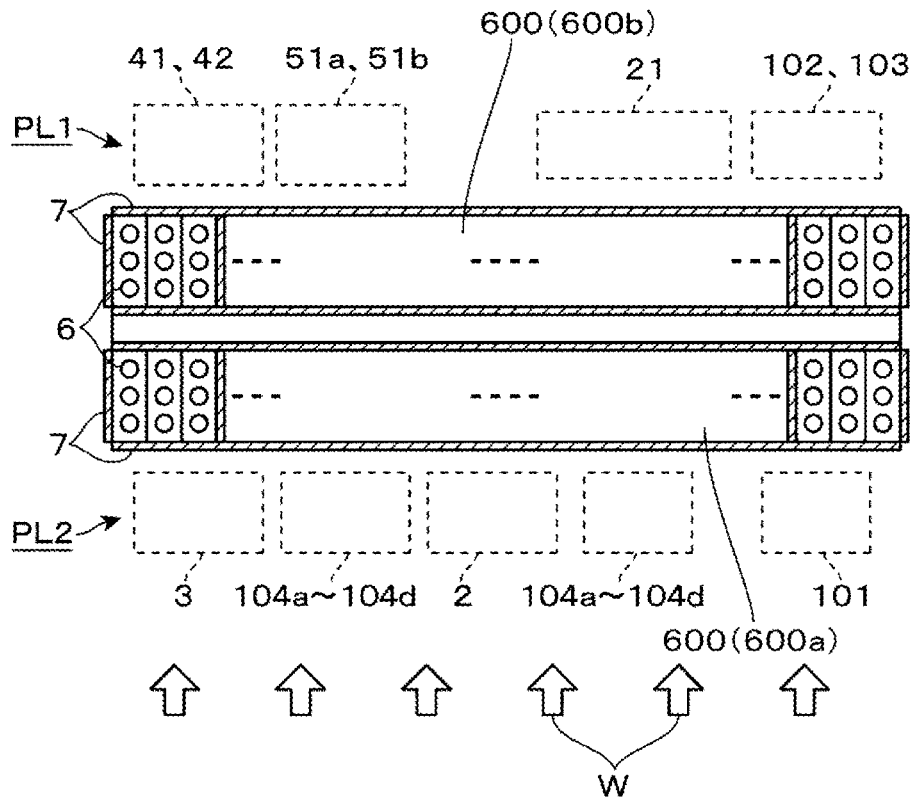
FIG. 3 is a plan view for illustrating a layout of a facility in the NG liquefier.
Figure 4:
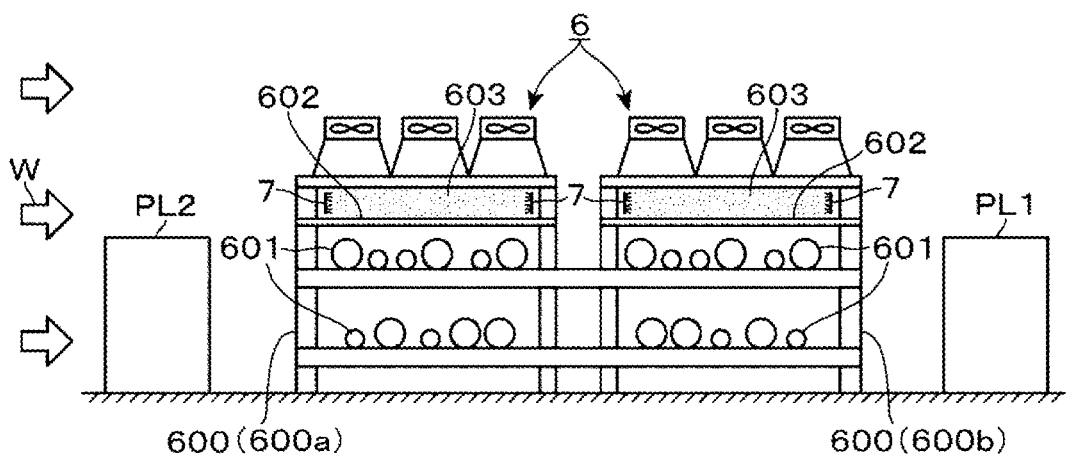
FIG. 4 is a side view for illustrating the layout of the facility in the NG liquefier.

Next, the layout of the NG liquefier is described with reference to FIG. 3 and FIG. 4. In a site in which the NG liquefier of this embodiment is provided, groups of each facility (facility groups PL1 and PL2) illustrated in FIG. 3 and FIG. 4 are aligned and arranged across a pipe rack 600 having framework structure. The pipe rack 600 supports a bundle of pipes 601 through which the components separated and recovered from the NG, various refrigerants (C3 and MR), the absorption solution to be used in the acid gas removal unit 101, and other fluids are caused to flow.

In the NG liquefier of this embodiment, the two-system pipe rack 600 (600a and 600b) are adjacently arranged in parallel with each other.

Further, in a top portion of the pipe rack 600 at a position above the bundle of the pipes 601 in the pipe rack 600, there are arranged, for example, one hundred or more ACHEs 6 including the aftercoolers 411 and 421, the desuperheaters 521a and 521b, the condensers 522a and 522b, and the subcoolers 523a and 523b, which are arranged downstream of the compressors 41, 42, 51*a*, and 51*b*, and the regenerated amine solution cooler 907 and the regeneration column overhead condenser 904, which are arranged in the acid gas removal unit 101.

As illustrated in FIG. 3, in the NG liquefier of this embodiment, the pipe rack 600 is formed into an elongated rectangle when viewed from an upper surface side. For example, three ACHEs 6 are arranged side by side in series along a short side of the rectangle, and a large number of groups, each including the three ACHEs 6, are arranged side by side along a long side of the rectangle.

A configuration example of the suction-type ACHE 6 is described with reference to a vertical sectional side view illustrated together with an enlarged view of the top portion of the pipe rack 600 of FIG. 5.

The ACHE 6 includes a tube bundle 630 obtained by binding a large number of tubes 63 through which the fluid to be cooled (MR, C3 refrigerant, absorption solution, and acid gas described above) is caused to flow, and a fan 62 arranged above the tube bundle 630.

Both upper and lower surfaces of the tube bundle 630 are opened so that the cooling air can flow therethrough from a lower side to an upper side via a gap between the adjacent tubes 63. An opening on the lower surface side of the tube bundle 630 corresponds to an intake for taking in the cooling air, and each ACHE 6 is arranged in the top portion of the pipe rack 600 under a state in which the intake is oriented downward.

A rotation center of the fan 62 is connected to an upper end portion of a rotation shaft 622 arranged so as to extend in a vertical direction. A lower side of the rotation shaft 622 penetrates through the tube bundle 630, and a lower end portion thereof is connected to a rotation drive unit 621 arranged below the tube bundle 630. As illustrated in FIG. 5, the rotation drive portion 621 may be formed of a rotary motor connected to the rotation shaft 622. Further, the rotation drive unit 621 may be constructed such that drive belts are looped around a fan pulley arranged in the lower end portion of the rotation shaft 622 and a motor pulley on the rotation shaft side of the rotary motor arranged on a lateral side of the fan pulley so as to rotate the rotation shaft 622 via the drive belts (the fan pulley, the rotary motor having the motor pulley, and the drive belt are not shown).

In a region extending from an upper surface of the tube bundle 630 to the lateral side of the fan 62, a discharge duct 61 configured to cause air having passed through the tube bundle 630 to flow therethrough is arranged. The discharge duct 61 is gradually reduced in diameter from a lower side to an upper side and has a straight pipe shape at the lateral position of the fan 62.

When the fan 62 of the ACHE 6 having the configuration described above is rotated, a flow of air passing through the tube bundle 630 from a lower side to an upper side is formed, and the cooling air is supplied to the surface of each tube 63, to thereby cool the fluid to be cooled flowing through the tube 63. The cooling air used for cooling the fluid to be cooled flows into the discharge duct 61 from the upper surface side of the tube bundle 630 and is discharged outside through an opening on an upper end side of the discharge duct 61.

A louver capable of adjusting an opening degree may be arranged in an opening portion of the discharge duct 61 at a height position on an upper side of from several centimeters to tens of centimeters of the fan 62.

Figure 5:
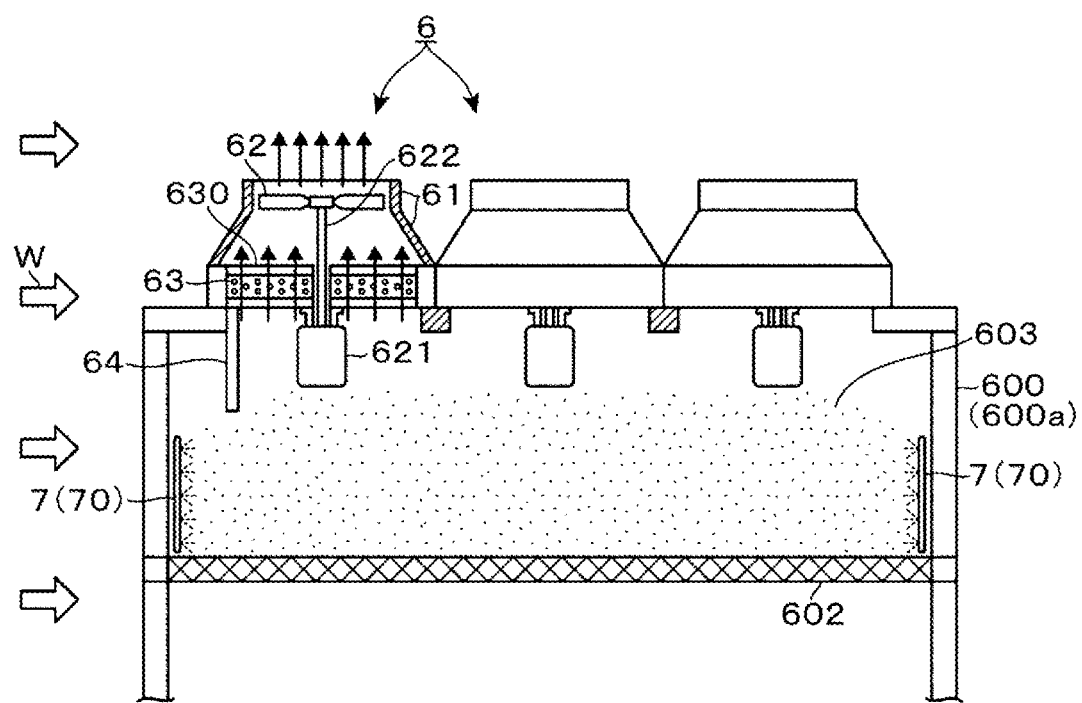
FIG. 5 is an enlarged view of a top portion of a pipe rack arranged in the NG liquefier.

In a space above the pipe rack 600 having the configuration described above, a floor 602 configured to partition the bundle of the pipes 601 and the ACHEs 6 is arranged (FIG. 4 and FIG. 5). The floor 602 is arranged at a position about 2 meters to about 5 meters below a lower surface side of the tube bundle 630 having the intake for the cooling air formed therein. A lower space 603 between the floor 602 and the large number of ACHEs 6 arranged in the top portion of the pipe rack 600 serves as a region through which the cooling air to be taken into each ACHE 6 is caused to flow.

The floor 602 is formed of, for example, a grating so that the cooling air can be taken into the lower space 603 formed between the ACHEs 6 and the floor 602 from a lower side of the floor 602. Further, a side surface of the pipe rack 600 having the framework structure is in, for example, an opened state so that the cooling air can also be taken into the lower space between the ACHEs 6 and the floor 602 from the side surface side.

Further, the NG liquefier of this embodiment includes a mist supply section 7 configured to supply mist obtained by spraying demineralized water to the cooling air taken into the ACHEs 6 toward the lower space 603 between the ACHEs 6 and the floor 602, to thereby cool the cooling air through use of vaporization heat of the mist.

Figure 6:
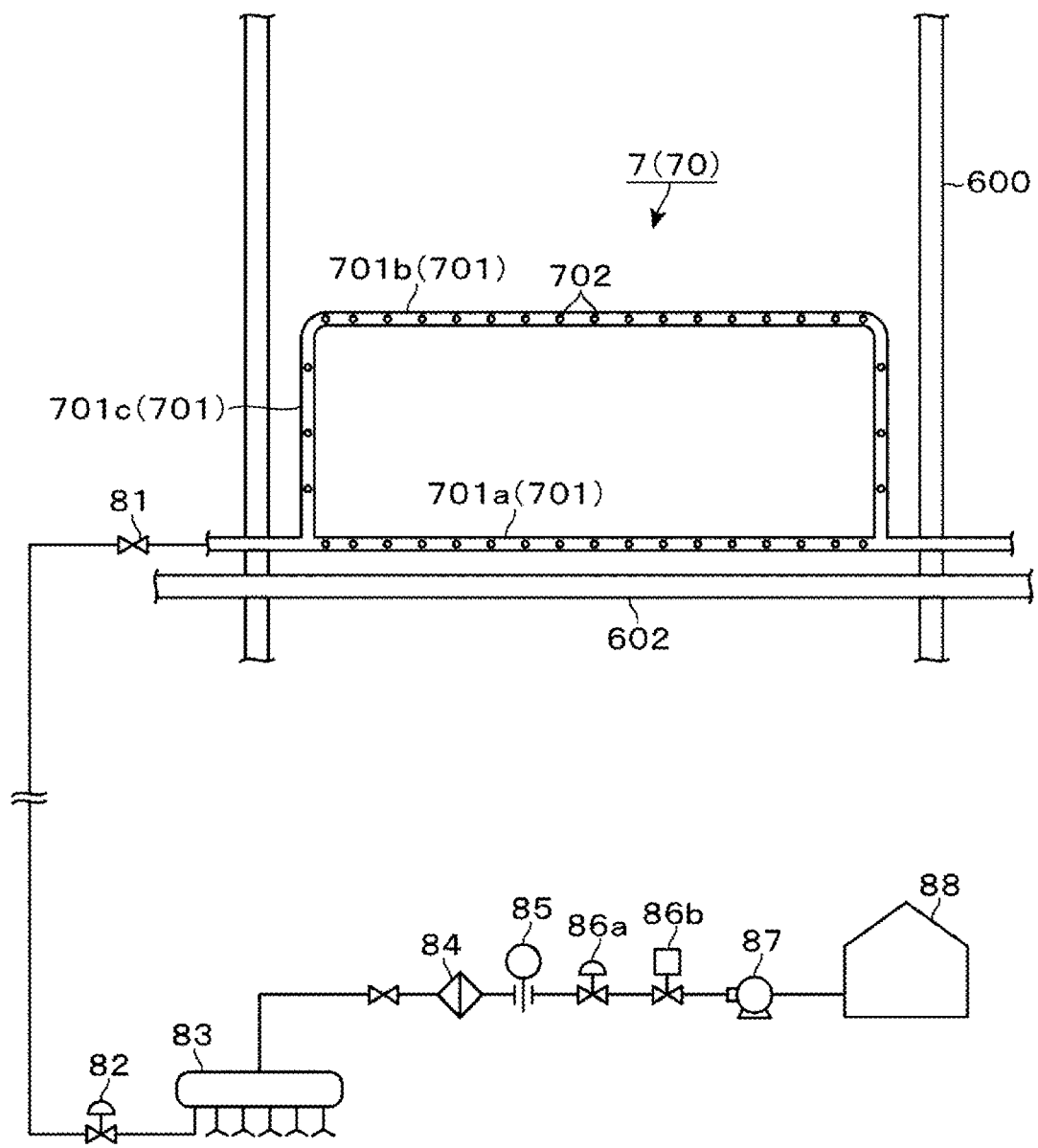
FIG. 6 is a side view of a mist supply section arranged in the pipe rack.

As illustrated in FIG. 6, the mist supply section 7 has structure in which a large number of spray nozzles 702 configured to spray the demineralized water toward the lower space 603 are formed along an extending direction of a water supply pipe 701 through which the demineralized water is caused to flow. The mist supply section 7 of this embodiment includes a lower-side water supply pipe 701*a* arranged along the floor 602, an upper-side water supply pipe 701*b* arranged in parallel with the lower-side water supply pipe 701*a* at a height position within a range of from about ½ to about ⅔ of a lower side of a height from the floor 602 to the intake of the ACHE 6, and a lateral water supply pipe 701*c* extending in a vertical direction. A large number of mist supply units 70, each including the water supply pipes 701*a* to 701*c* connected to each other in a rectangular shape, are connected to each other.

It is preferred that the particle diameter of the mist of the demineralized water be as small as possible, and hence the opening diameter of the spray nozzle 702 and the supply pressure of the demineralized water to be supplied to the mist supply unit 70 are set so that the spray pressure from each of the spray nozzles 702 becomes higher.

As illustrated in FIG. 6, the mist supply section 7 including the large number of mist supply units 70 connected to each other is connected to a water supply header 83 through an open/close valve 81 and a flow control valve 82. An upstream side of the water supply header 83 is connected to a demineralized water tank 88 through a foreign particle removal filter 84, a flow meter 85, a flow control valve 86*a*, a shutoff valve 86*b*, a water supply pump 87, and other components.

The demineralized water tank 88 stores the demineralized water supplied from, for example, a demineralized water producing apparatus (not shown) provided adjacently to the NG liquefier. The demineralized water means water having salts removed therefrom, and examples of the demineralized water include deionized water having passed through an ion-exchange resin, reverse osmosis (RO) water having passed through a reverse osmosis membrane, and distilled water. Through use of the demineralized water, the adhesion of scales derived from salts to the surface of the tube 63 of the ACHE 6 can be suppressed, thereby being capable of suppressing decrease in cooling efficiency.

It is difficult to completely remove the salts of the demineralized water. Therefore, when the surface of the tube 63 is wetted with the demineralized water over a long period of time, there is a risk of the decrease in cooling efficiency and the corrosion of the surface of the tube 63, which are involved in the adhesion of the scales.

In view of the foregoing, the mist supply units 70 forming the mist supply section 7 of this embodiment are arranged at a position capable of reducing a ratio of the mist reaching the intake for the cooling air without being evaporated.

From the above-mentioned viewpoint, as indicated by the diagonal hatching in FIG. 3, the mist supply units 70 forming the mist supply section 7 are arranged, for example, on a long side and a short side of the pipe rack 600 and between a plurality of the groups of the ACHEs 6 along the short side direction. With the above-mentioned configuration, the mist can be supplied by spraying the demineralized water from a lateral position toward the lower space 603 between the ACHEs 6 and the floor 602, which is on an upstream side of the intake for the cooling air.

As illustrated in FIG. 5, when the mist of the demineralized water is supplied from the mist supply section 7 arranged at the lateral position of the lower space 603, the movement distance of the mist from the spray nozzles 702 to the intake of the ACHE 6 is increased as compared with the case where the mist supply section 7 is arranged along an upper surface of the floor 602 and the demineralized water is sprayed upward. As a result, the ratio of the mist that is evaporated before reaching the intake of the ACHE 6 is increased, thereby being capable of suppressing the decrease in cooling efficiency and the corrosion that may be caused by wetting of the tubes 63 in the tube bundle 630 with the demineralized water.

For example, when the average flow velocity of the cooling air to be taken into the intake of the ACHE 6 is from 3 meters/sec to 4 meters/sec, it is appropriate that the height position at which the spray nozzles 702 are arranged be regulated so that the mist supply section 7 (mist supply units 70) is arranged at a position at which the time required for the mist sprayed from the spray nozzles 702 to be taken into the intake is sufficiently maintained.

In the NG liquefier installed in an area exposed to strong wind blowing from a predetermined direction at a particular time, such as sea breeze, a windshield 64 configured to block wind W blowing into the lower space 603 may be arranged at the intake of the ACHE 6 arranged at a position facing an inflow surface of the wind W, for example, in the pipe rack 600a arranged on a windward side (FIG. 5). By arranging the windshield 64, the cooling air is prevented from being swept away by the wind W, and the cooling air cooled with the mist can also be securely supplied to the ACHE 6 on an end portion side.

Figure 7:
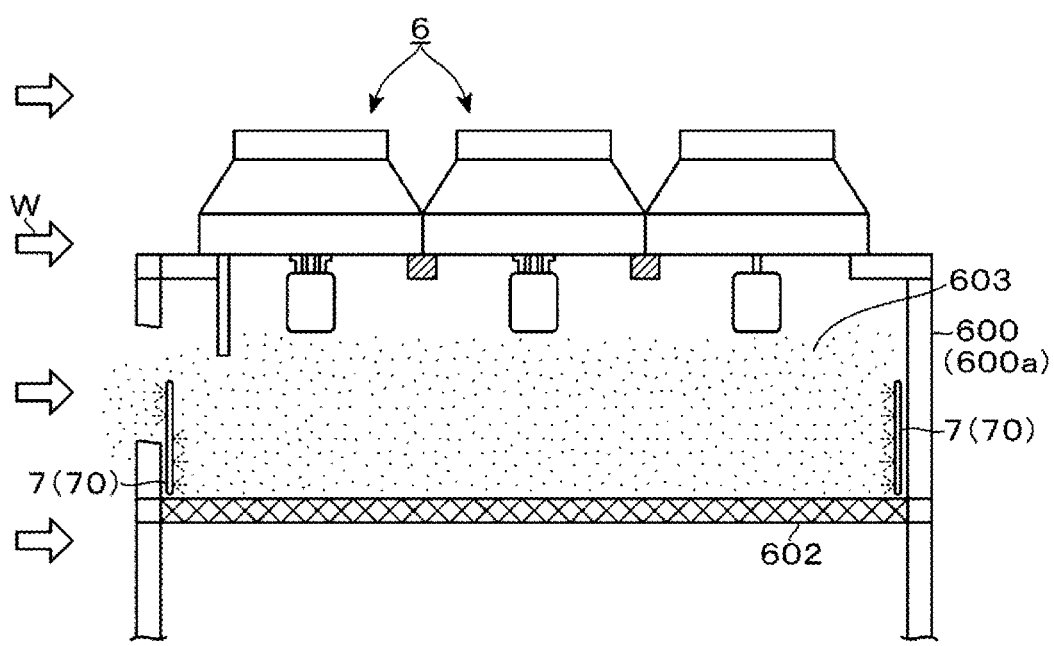
FIG. 7 is an enlarged view of a top portion of a pipe rack in which a mist supply section is arranged according to another embodiment of the present invention.

As another method for suppressing the influence of blowing of the wind W, as illustrated in FIG. 7, out of the plurality of spray nozzles 702 configured to spray demineralized water at different height positions, a part of the spray nozzles 702 (for example, the spray nozzles 702 on an upper side) may be opened so as to spray the demineralized water in a direction opposite to a direction opposed to the lower space 603. For example, by spraying the demineralized water in a direction opposed to a flow direction of the wind W blowing to the pipe rack 600a arranged on the windward side (direction opposite to the direction opposed to the lower space 603), the mist can be diffused into the flow of the cooling air, and the cooling air, which has been cooled with the mist, can also be supplied to the ACHE 6 on the end portion side.

In this case, the movable spray nozzles 702 capable of freely changing the direction of spraying the mist may be arranged in the mist supply section 7 so that the direction of spraying the demineralized water is changed in accordance with, for example, the strength and direction of the wind W.

The NG liquefier according to this embodiment includes the mist supply section 7 configured to spray the demineralized water from the lateral position on the upstream side of the intake for taking the cooling air into the ACHE 6. Therefore, the movement distance required for the mist of the demineralized water sprayed from the mist supply section 7 to reach the intake can be increased. As a result, the cooling performance of the ACHE 6 can be enhanced, while the ratio of the mist reaching the intake without being evaporated is reduced, to thereby suppress the influence on the apparatus from wetting of the tubes 63 of the ACHE 6 with the demineralized water.

Figure 8:
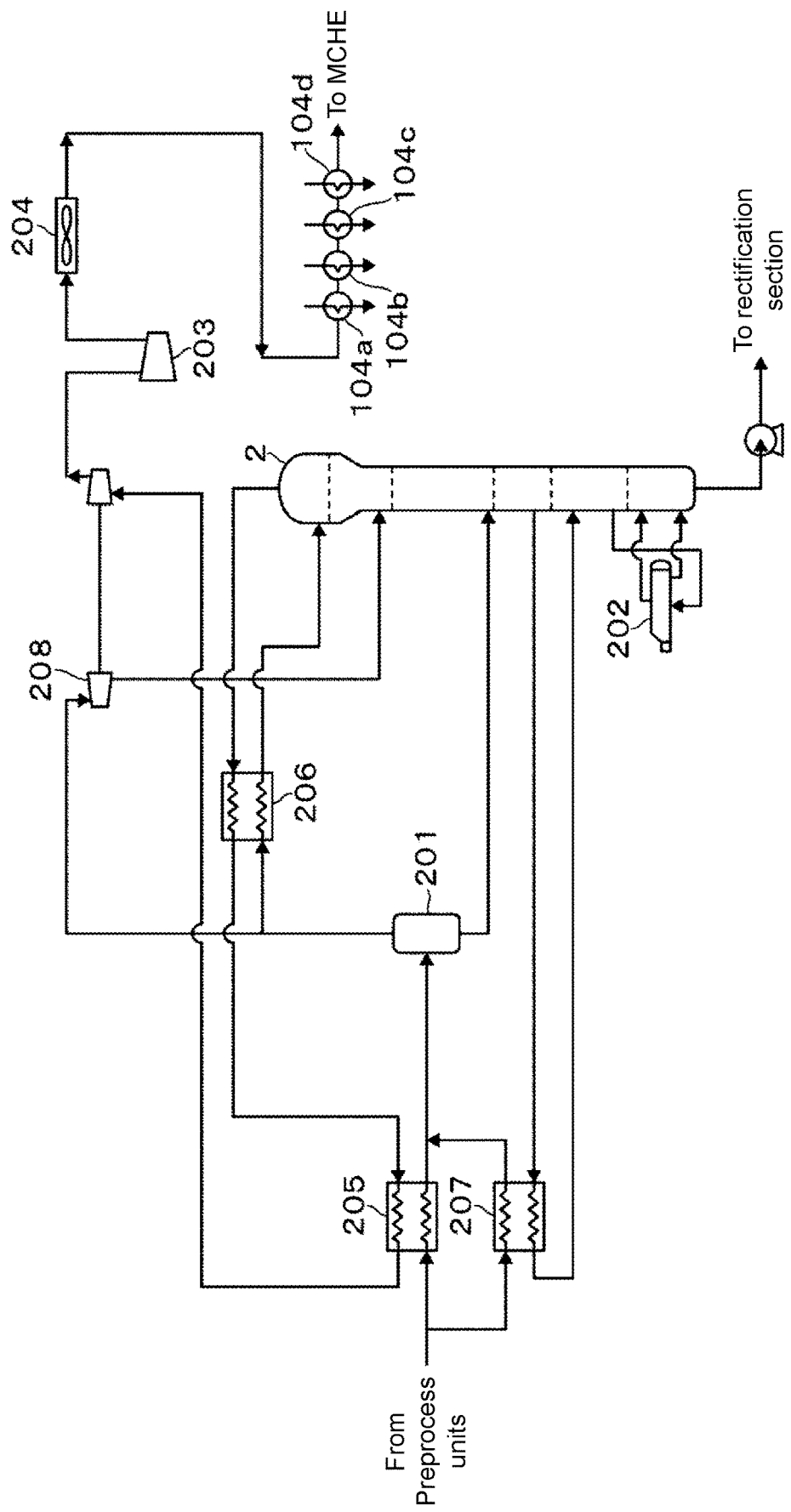
FIG. 8 is a schematic view for illustrating another embodiment of the present invention, which relates to a scrub column arranged in a NG liquefier.

FIG. 8 is an illustration of a configuration example of an apparatus for efficiently separating a component that is heavier than methane by a method different from that of the scrub column 2 illustrated in FIG. 1.

In FIG. 8, when the operating pressure is reduced significantly through a feed gas expander (gas expander) 208, a cryogenic temperature can be obtained, and the NG is cooled through use of the cold heat. For example, when 60 Bar of the NG is reduced to 40 Bar with the feed gas expander 208, cold heat of −80° C. is obtained. The cold heat from the column overhead of the scrub column 2 is used for cooling the NG after preprocesses in preprocess units (for example, the acid gas removal unit 101, the water removal unit 102, and the mercury removal unit 103), to thereby cool the NG to from −30° C. to −40° C. through a NG precooling heat exchanger 205. A heavy component that has become a liquid is separated by a NG feed gas drum 201, and the heavy component is sent to a low-stage portion of the scrub column 2.

Most of the gas extracted from the NG feed gas drum 201 is sent to the feed gas expander 208 and fed to a middle stage of the scrub column 2 while keeping the cryogenic temperature. The remaining gas extracted from the NG feed gas drum 201 is sent to a feed gas reflux heat exchanger 206 and subjected to heat exchange with the gas at low temperature from the column overhead of the scrub column 2 to become a condensate completely. The condensate is sent to the column overhead of the scrub column 2. A trace amount of the heavy component is effectively separated with the reflux liquid. The temperature of a scrub column side reboiler 207 of the scrub column 2 is lower than that of the NG feed gas, and hence the scrub column side reboiler 207 is used for precooling the NG. In the scrub column 2, a column bottom liquid is heated by a scrub column bottom reboiler 202, and thus a distillation operation for separating the NG into a gas that is lighter than methane and a liquid that is heavier than ethane is performed.

After the gas extracted from the column overhead of the scrub column 2 is subjected to heat exchange and a compression operation, the gas is increased to a predetermined pressure by a booster compressor 203 to be supplied to the MCHE 3.

A booster compressor aftercooler 204 formed of the ACHE 6 is arranged downstream of the booster compressor 203. When the mist supply section 7 is arranged in the ACHE 6 forming the booster compressor aftercooler 204, the cooling performance of the ACHE 6 can be enhanced while the influence on the apparatus from wetting of the tubes 63 with the demineralized water is suppressed. In this case, the gas extracted from the column overhead of the scrub column 2 corresponds to the fluid to be cooled.

The gas processing facility in which the cooling performance of the ACHE 6 is enhanced through use of the mist supply section 7 configured to spray the demineralized water from the lateral position to the lower space 603 below the ACHE 6 is not limited to the example of the NG liquefier illustrated in FIG. 1, FIG. 2, and FIG. 8. For example, the scrub column 2 illustrated in FIG. 8 and the peripheral apparatus may also be used as a natural gas liquids (NGL) apparatus configured to recover a liquid containing a condensate, which is heavier than ethane, from the NG, and to ship the gas, which is lighter than methane, to a consumer in a gas state without being liquefied or consume the gas as fuel gas in a plant. In this case, by arranging the mist supply section 7 in the ACHE 6 forming the booster compressor aftercooler 204, the cooling performance of the ACHE 6 can also be enhanced while the influence on the apparatus from wetting of the tubes 63 with the demineralized water is suppressed.

As described above, besides the NG liquefier configured to perform a liquefaction process of the NG and the NGL apparatus configured to perform separation and recovery of a component in the NG, as a gas apparatus that may adopt the ACHE in which the mist supply section 7 of this embodiment is arranged, there may also be given a gas-to-liquid (GTL) apparatus configured to produce synthesis gas (gas containing carbon monoxide and hydrogen as main components) using the NG as a raw material and synthesize liquid fuel from the synthesis gas.

That is, the mist supply section 7 of this embodiment may also be arranged in the ACHE 6 configured to cool the synthesis gas obtained through a synthesis gas production step of the gas-to-liquid (GTL) apparatus, and in the ACHE 6 configured to cool light gas components (hydrogen, carbon monoxide, carbon dioxide, methane, etc.) generated from a Fischer-Tropsch (FT) synthesis reactor.

Besides the GTL apparatus, the mist supply section 7 of this embodiment may also be applied to the ACHE 6 configured to cool the synthesis gas obtained from an apparatus for producing synthesis gas from the NG, and to the ACHE 6 configured to cool light gas components from a methanol synthesis reactor, an ammonia synthesis reactor, and a diethyl ether direct synthesis reactor each using the NG and the synthesis gas as raw materials.

The configuration of the ACHE 6 arranged in the gas processing facility in this case is not limited to the suction type example illustrated in FIG. 5. For example, the mist supply section 7 of this embodiment may also be applied to a forced-air ACHE 6 in which the tube bundle 630 is arranged on an outlet side of the discharge duct 61, and the fan 62 is arranged below the tube bundle 630. When the fan 62, the rotation drive unit 621, and other devices are prevented from being wetted with the mist of the demineralized water, the corrosion of those devices can be suppressed.

Further, it is not necessarily required to form the floor 602 on a lower surface of the lower space 603 to which the demineralized water is sprayed. For example, the lower space 603 below the intake of the ACHE 6 may be opened toward the space in which the bundle of the pipes 601 is supported.

Further, the mist supply section 7 arranged in the gas processing facility may not spray the demineralized water constantly. For example, there may be provided timing for stopping the spraying of the demineralized water from the mist supply section 7 partially or entirely in the mist supply section 7 depending on the weather, as in the case where atmospheric temperature is low and the spraying of the demineralized water is not required, or in the case where humidity is high and the effect of the spraying of the demineralized water is small.

The invention claimed is:

1. A gas processing facility for performing at least one of liquefaction of natural gas, separation and recovery of a component in the natural gas, production of synthesis gas from the natural gas, or synthesis of a compound containing the natural gas or the synthesis gas as a raw material, the gas processing facility comprising:
    an air-cooled heat exchanger configured to supply cooling air taken through an intake into a tube through which a fluid to be cooled is caused to flow, to thereby cool the fluid to be cooled;
    a windshield arranged at the intake of the air-cooled heat exchanger configured to block wind flowing into a space below the air-cooled heat exchanger, wherein the windshield is arranged at a position facing an inflow direction of the wind; and
    a mist supply section configured to supply mist, which is obtained by spraying demineralized water to the cooling air to be taken into the air-cooled heat exchanger, to thereby cool the cooling air,
    the mist supply section being configured to spray the demineralized water from a lateral position on an upstream side of the intake.

2. The gas processing facility according to claim 1, further comprising a pipe rack having a framework structure, which is configured to hold a bundle of pipes through which the fluid to be cooled is caused to flow,
    wherein the air-cooled heat exchanger is arranged in a top portion of the pipe rack at a position above the bundle of the pipes in a state in which the intake is oriented downward, and
    wherein the mist supply section is configured to spray the demineralized water from a lateral side toward the space below the air-cooled heat exchanger having the intake opened therein.

3. The gas processing facility according to claim 2,
    wherein the pipe rack comprises a floor configured to partition the bundle of the pipes and the air-cooled heat exchanger, and
    wherein the demineralized water is sprayed from the mist supply section toward a space between the air-cooled heat exchanger and the floor.

4. The gas processing facility according to claim 3, wherein the mist supply section is configured to spray the demineralized water at a height position within a range of up to two thirds of a lower side of the height from the floor to the intake of the air-cooled heat exchanger.

5. The gas processing facility according to claim 2,
    wherein the pipe rack is formed into a rectangle when viewed from an upper surface side of the pipe rack,
    wherein the air-cooled heat exchanger comprises a plurality of air-cooled heat exchangers arranged side by side in series along a short side of the rectangle, and
    wherein a plurality of groups, each including the plurality of air-cooled heat exchangers, are arranged side by side along a long side of the rectangle.

6. The gas processing facility according to claim 5, wherein the mist supply section is arranged along the long side of the pipe rack.

7. The gas processing facility according to claim 2, wherein the mist supply section comprises a plurality of spray nozzles configured to spray the demineralized water at different height positions.

8. The gas processing facility according to claim 7, wherein, out of the plurality of spray nozzles configured to spray the demineralized water at the different height positions, a part of the plurality of spray nozzles is configured to spray the demineralized water in a direction opposite to a direction opposed to the space below the air-cooled heat exchanger.

\* \* \* \* \*